United States Patent [19]

Bates

[11] 4,260,980

[45] Apr. 7, 1981

[54] BLIND SPOT DETECTOR FOR VEHICLES

[76] Inventor: Mitchell G. Bates, 428 S. Harrison, Nixa, Mo. 65714

[21] Appl. No.: 34,639

[22] Filed: Apr. 30, 1979

[51] Int. Cl.³ .................... G08G 1/00; G08B 13/16
[52] U.S. Cl. .................................... 340/32; 340/34; 340/52 H; 367/93; 367/909
[58] Field of Search .................. 340/31 R, 32, 33, 34, 340/70, 38 R, 38 S, 51, 63, 53, 61, 52 H; 367/93, 94, 13, 112, 909, 95; 343/7 VM, 18 R; 180/167, 169

[56] References Cited

U.S. PATENT DOCUMENTS

| | | | |
|---|---|---|---|
| 3,360,775 | 12/1967 | Schroeder | 340/32 |
| 3,431,550 | 3/1969 | Spence | 367/93 |
| 3,569,924 | 3/1971 | Drake et al. | 367/93 |
| 3,594,768 | 7/1971 | Harris et al. | 367/93 |
| 3,863,196 | 1/1975 | Hilles | 367/93 |
| 3,898,640 | 8/1975 | Hossbach | 367/93 |
| 3,997,866 | 12/1976 | Taylor et al. | 367/93 |
| 4,106,003 | 8/1978 | Otani | 367/93 |

*Primary Examiner*—James J. Groody
*Attorney, Agent, or Firm*—William S. Dorman

[57] ABSTRACT

Apparatus for detecting the presence of an object moving relative to a vehicle within a location adjacent said vehicle, which location is hidden from the view of the operator of the vehicle; which comprises a first transducer mounted on the vehicle for transmitting sonic signals in a frequency range of about 30 to 40 Khz into the hidden location, a second transducer mounted on the vehicle in spaced relation to the first transducer for receiving a portion of the sonic signals reflected from an object present in the hidden location, a first high frequency (transmitter) audio amplifier powering the first transducer to cause the first transducer to transmit the sonic signals in the frequency range of 30 to 40 Khz, a second high frequency (receiver) audio amplifier for amplifying the signals received by the second transducer, a tuned amplifier for receiving a portion of the amplified signals from the receiver amplifier and being simultaneously coupled to the transmitter amplifier; the transmitting transducer, the transmitter amplifier, the receiver transducer, the receiver amplifier and the tuned amplifier together constituting a feedback oscillator; the tuned amplifier having an output only when there is relative motion between the object and the vehicle, this output from the tuned amplifier comprising a relatively low audio frequency signal representing a differential frequency between the transmitted signals and the received signals resulting from the change in the transmitted signals as produced by the relative motion between the object and the vehicle, a low frequency audio amplifier for amplifying a portion of the output of the tuned amplifier, and means responsive to the amplified signal from the low frequency audio amplifier for actuating an alarm when the output from the tuned amplifier exceeds a predetermined value.

6 Claims, 5 Drawing Figures

BLIND SPOT DETECTOR FOR VEHICLES

BACKGOUND OF THE INVENTION

1. Field of the Invention

The present invention relates to an apparatus for detecting the presence of objects in locations hidden from the view of an operator of a vehicle and, more particularly, this apparatus detects the presence of these objects by the relative motion between the vehicle and the object within the hidden location.

2. The Prior Art

The prior art discloses, broadly, devices for detecting the presence of objects relative to vehicles and even devices, such as police radar, for detecting relative motion between the vehicle and an object. However, the prior art does not disclose any apparatus or device similar to that disclosed herein.

SUMMARY OF THE INVENTION

The present invention includes, briefly, a pair of substantially identical transducers mounted approximately 5 feet apart on the outside of a vehicle and angled slightly towards each other. One transducer is the transmitting transducer and the other is the receiving transducer. An oscillator circuit is provided to power the transmitting transducer to emit sonic signals in the frequency range of 30 to 40 Khz. The receiving transducer will receive a portion of the transmitted signal as feedback, which controls the operation of the oscillator. Any object moving in the field between the transducers will result in a change in the feedback, thus changing the output of the oscillator. If the object is moving relative to the vehicle, the output from a tuned amplifier in the oscillator circuit will be a low frequency signal representing the difference between the transmitted signal and the received signal whose frequency will be altered somewhat by the motion of the object within the field. The strength of this low frequency signal will also be determined by the proximity of the moving object to the vehicle. At any event, the low frequency signal will be amplified, rectified and then used to fire a relay which actuates an alarm to alert the operator of the vehicle that an object is within a "blind spot" of the vehicle.

DETAILED DESCRIPTION OF THE PREFERRED EMBODIMENTS

Figure 2:
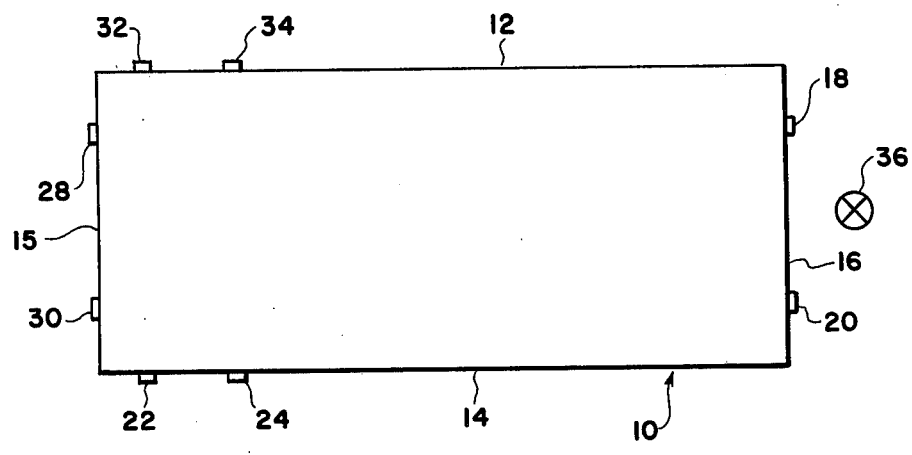
FIG. 2 is a semi-diagramatic plan view of the vehicle shown in FIG. 1.
Figure 1:
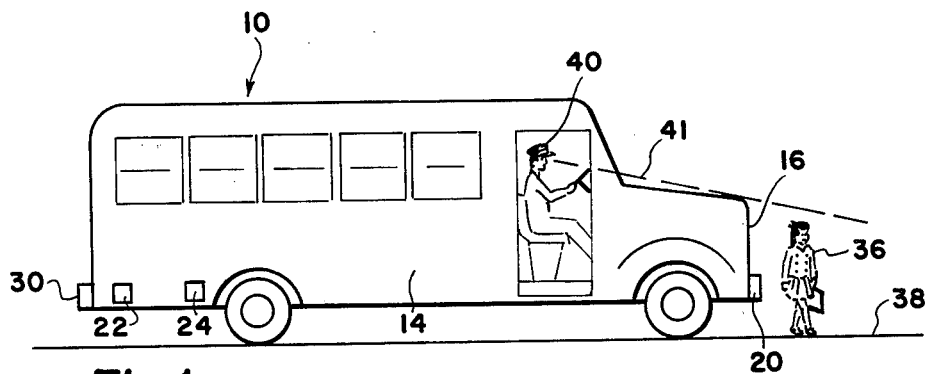
FIG. 1 is a side elevational view of a vehicle embodying the present invention, and showing a child located in a "blind spot" in front of the vehicle.

Referring to the drawings in detail, FIGS. 1 and 2 show a vehicle 10, such as a school bus, or the like (but not limited thereto), which can be provided with one or more sensing devices (or groups of sensing devices), hereinafter sometimes referred to as "blind spot" detectors, which blind spot detectors embody the present invention. These blind spot detectors, which will be described hereinafter in greater detail, are referred to as such because they detect the presence of persons or objects located within areas, commonly known as "blind spots", where the vehicle operator is unable to visually detect their presence. The sensing system of the present invention detects any motion, that is any object that moves relatively with respect to the sensing system; the sensing system also transforms this detected motion into an audible or visual warning to the vehicle operator. The sensing system of the present invention functions in a manner similar to the type of police radar which utilizes the Doppler effect. However, instead of utilizing the microwave frequencies employed in police radar, the present invention utilizes audio frequencies (sonic and ultrasonic) low enough that simple transducers could transmit and receive energy, but high enough that there would be no irritation to the human ear, and also high enough that the system would not be subject to interference by normal traffic noise. The preferred range of frequencies is between 30 and 40 Khz. Thus, a distinguishing feature of the present invention over the prior art is that the sensing system employs ultrasonic transducers operating at frequencies low enough (30 to 40 Khz) so that the transducers may deliver and receive the signals directly (without the need for transmitting and receiving antennae), and, whereby, a simple audio amplifying and detecting circuit can be used to operate an alarm.

Each blind spot detector of the present invention is composed of a transmitting transducer and a receiving transducer, which can be considered as a sensing group. A sensing group can be mounted at any convenient location on the exterior portion of the vehicle 10. Each sensing group is electrically connected to a sensing circuitry which is mounted within the vehicle 10 and which is adapted to operate an alarm, as will hereinafter appear.

As shown in FIGS. 1 and 2, the vehicle 10 can be considered as having a left side 12, a right side 14, a rear 15 and a front 16. A sensing group can be mounted at the forward end 16 of the vehicle, and this sensing group consists of transducers 18 and 20. As will hereinafter appear, the transducer 18 is the transmitting transducer and the transducer 20 is the receiving transducer.

It is also recognized that the right rear portion of the school bus also constitutes a possible "blind spot". Thus, another sensing group consisting of transducers 22 and 24 are located adjacent the rear of the side 14 as shown in FIGS. 1 and 2. Again, since the rear of the bus also provides another possible "blind spot", another sensing group consisting of transducers 28 and 30 can be attached to the rear 15 of the bus 10. Finally, since the left rear portion of the bus obviously constitutes another possible "blind spot", another sensing group consisting of transducers 32 and 34 can be attached to the rear of the side 12 of the bus 10. With respect to the last three sensing groups, it is immaterial which transducer of each group is the transmitting transducer, and the other transducer of the group would obviously be the receiving transducer; for example, with respect to the sensing group on the rear of the bus, the transducer 28 can be the transmitting transducer, whereas, the transducer 30 can be the receiving transducer, or vice versa, since, as will hereinafter appear, the receiving and transmitting transducers are interchangable.

Figure 3:
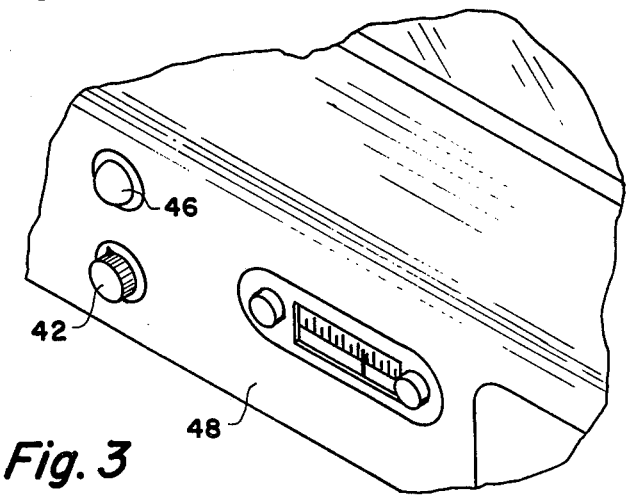
FIG. 3 is a partial perspective view depicting a portion of a vehicle instrument panel having one form of warning device installed thereon together with a sensitivity control.

Returning now to a further consideration of the sensing group which is mounted on the front 16 of the vehicle 10, the transducers 18 and 20 can be considered as creating a sensing area or field which extends in a direction substantially perpendicular to the plane of the front 16. When an object or person 36 moves into the "field" of the transducers 18 and 20, the sensing system will warn the vehicle operator 40 by electrically activating a warning device 46 (a light) which can be mounted on the vehicle's panel 48 (FIG. 3). For example, after exiting from a school bus, small children often cross the roadway 38 in front of a school bus in such a manner that the driver or operator is unable to see the children. As shown in FIG. 1, the sensing group at the forward end of the vehicle would warn the vehicle operator 40 of the presence of a child 36 who is located in front of the vehicle 10 and beneath the line of sight 41 of the vehicle operator 40.

Figure 4:
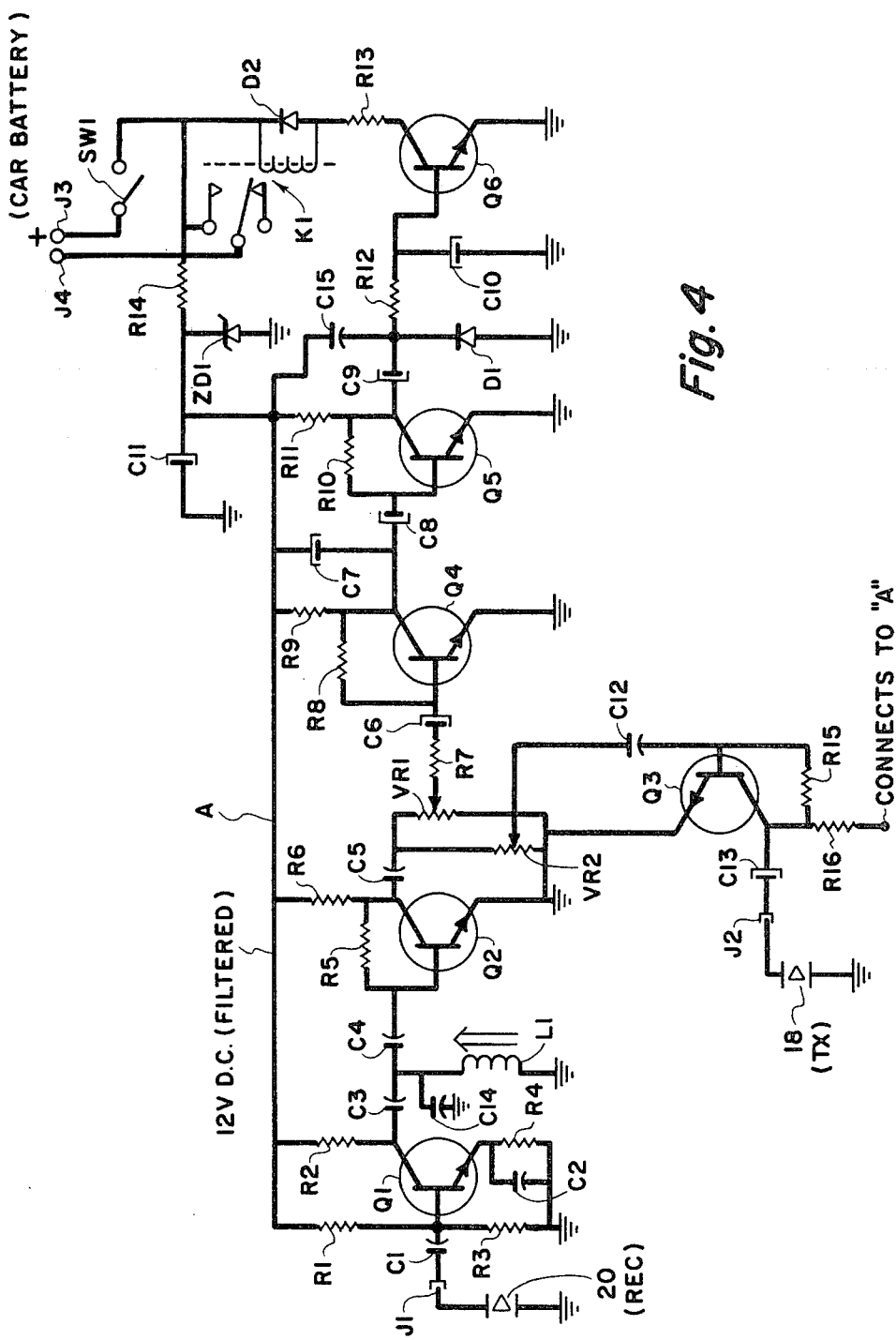
FIG. 4 is a circuit diagram of the electrical circuit employed in the present invention.
Figure 5:
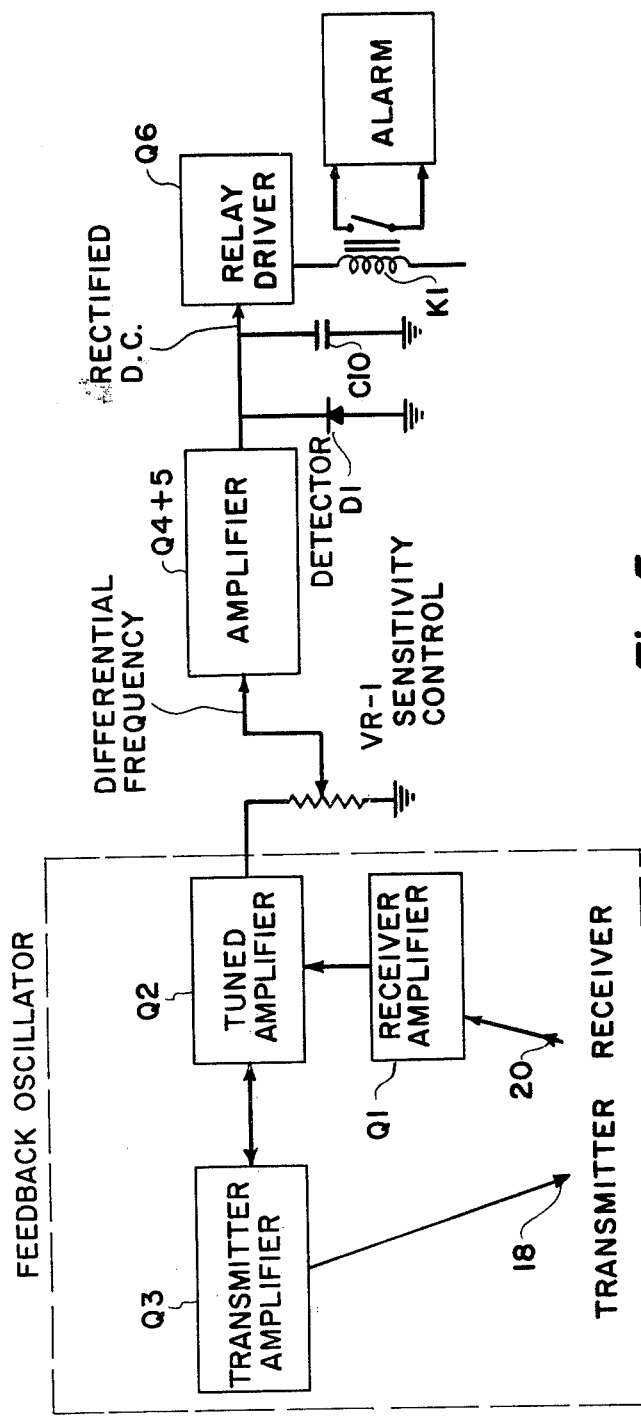
FIG. 5 is a block diagram of the invention based upon the circuit diagram shown in FIG. 4.

Referring now to FIGS. 4 and 5, the detailed description which follows pertains to the operation of the electrical circuitry which connects between the transducers 18 and 20 and the alarm system which alerts the operator to the presence of a child or other moving object within the field of the sensing system which is mounted on the front end of the vehicle 10. It should be understood, however, that the same or similar circuit (not shown) would be employed for each of the other sensing groups comprised of the transducers 22 and 24, the transducers 28 and 30 and the tranducers 32 and 34. Each such separate circuit could be provided with its separate alarm (not shown), such as a buzzer or light; or all circuits for the individual sensing groups could operate the same alarm, such as a single buzzer (not shown) or the lamp 46. Power is supplied to the circuit through a conventional 12-volt vehicle or car battery (not shown) to the jack J3. The jack J3 connects with a circuit through a switch SW1 which can be a separate switch or which could be the conventional ignition switch. Since it has been discovered that the circuit shown herein draws less than ¼ amp, it is preferable that the switch SW1 be the ignition switch, in which case the circuit is "on" whenever the ignition switch is turned on. Since the vehicle battery is often times noisy and sometimes unstable, a resistor R14, zener diode ZD1 and capacitor C11 serve to provide a stable, filtered 12-volt DC voltage along the line A. The resistor R14 is preferably about 47 ohms, the zener diode ZD1 is preferably EGC 5081 or equivalent, and the capacitor C11 is preferably an electrolytic capacitor of approximately 220 mfd; if the sensing system is to be installed on an exceptionally noisy vehicle, the value of capacitor C11 can be increased.

All the transistors shown on FIG. 4 are preferably EGC 123 or equivalent. A high frequency (transmitter) audio amplifier Q3, in conjunction with transducer 18, constitutes a portion of a feedback oscillator circuit (as will hereinafter appear), whereby the transducer 18 will emit an audio signal at approximately 33 Khz. The transducer 18 is preferably of the type sold under the designation Calectro Cat. No. J4-815 or equivalent. The transducer can be plugged into the circuit of Q3 by means of the jack J2. An electrolytic capacitor C13, having a value of approximately 1 mfd connects in series between the transducer 18 and the collector of Q3. The collector of Q3 also connects with the filtered DC voltage at "A" through the resistor R16 which has an approximate value of 1K ohms. The collector of Q3 connects with its base through a resistor R15 of approximately 200K ohms.

The first receiving state, which comprises a second high frequency audio amplifier Q1 and the receiving transducer 20 operates as a relatively high gain, low input voltage stage. The base of receiver amplifier Q1 is provided with a fixed bias by means of resistor R1 of approximately 33K ohms which connects from "A" to the base and resistor R3 of approximately 10K ohms which connects from the base of Q1 to ground. Emitter stabilization is provided by R4 of approximately 1K ohms and C2 of approximately 0.1 mfd which are connected in parallel from the emitter to ground. The receiving transducer 20 is identical with the transmitting transducer 18 and connects with the circuit of Q1 through the jack J1; a capacitor C1 of approximately 0.05 mfd connects in series between the jack J1 and the base of the transistor Q1. The collector of Q1 connects with "A" through R2 of approximately 3K ohms.

A capacitor C3 of approximately 0.1 mfd connects from the collector of Q1 to another capacitor C4 of approximately 0.05 mfd which, in turn, connects with the base of transistor Q2. A variable inductance coil L1, having a variable inductance between 8 and 20 mh connects from the point of connection between capacitor C3 and C4 and ground. L1 is preferably a coil of the type sold under the designation Miller coil 9061. A tuning capacitor C14 of approximately 0.01 mfd connects in parallel with the coil L1. The coil L1 and the capacitors C14, C3 and C4 constitute a tuning circuit which can be set to the peak response frequency of 33Khz of the transducers 18 and 20 by means of the screw driver adjustment on the coil L1. This adjustment is made prior to the installation of the circuit in the vehicle.

The stage which includes the transistor Q2 can be described as a tuned amplifier stage, as will be explained hereinafter. The emitter of Q2 is grounded as shown, and the collector connects through a resistor R6 of approximately 1K ohms to the filtered DC voltage at "A". A bias resistor R5 of approximately 150K ohms connects between the base and the collector of transistor Q2. The collector of Q2 also connects with a capacitor C5 of approximately 0.05 mfd which, in turn, connects with a variable feedback resistor VR2 having a maximum resistance of approximately 10K ohms. The variable connection of VR2 connects through a capacitor C12 of approximately 0.05 mfd to the base of Q3. The position of the variable adjustment on VR2 should be adjusted as a "factory" adjustment prior to installation by adjusting the same for the largest undistorted sign wave output of the transmitting transducer 18 as measured by an oscilloscope at jack J2.

A second variable resistor VR1 of approximate maximum value of 10K ohms is connected in parallel across VR2. The variable portion of VR1 connects through a resistor R7 of approximately 1K ohms to an electrolytic capacitor C6 of approximately 1 mfd, and the capacitor, in turn, connects with the base of transistor Q4. The purpose of Q4 is to amplify the signal (if any) developed across VR1 as will be explained hereinafter. The emitter of Q4 is grounded and its collector connects to the voltage at "A" through the resistor R9 of approximately 3.3K ohms. A bias resistor R8 of approximately 1.2M ohms connects between the base and the collector of Q4. An electrolytic capacitor C7 of approximately 1 mfd connects in parallel across R9 and serves as a high frequency filter capacitor.

Q5, like Q4, is a very low frequency audio amplifier. The term "low frequency" is used because these stages are intended to amplify only the frequency change (as will be explained hereinafter) caused by movement in the field of the transducers. R7, which has been previously described, is a sensitivity limiting resistor to prevent damping of the transmitter 20. The amplified signal from the collector of Q4 is fed into the base of Q5 through an electrolytic capacitor C8 of approximately 1 mfd. The emitter of Q5 is grounded and the collector connects with the voltage at "A" through resistor R11 of approximately 1K ohms. Bias resistor R10 of approximately 150K ohms connects between the base and collector of Q5.

The signal (if any) developed at the collector of Q5 is fed through an electrolytic capacitor C9 of approximately 10 mfd to a negative clip diode D1, which can be silicon diode having a rating equal to or exceeding 500 ma, 50 piv. The positive side of the diode D1 connects through a resistor R12 of approximately 56K ohms which, in turn, connects with an electrolytic capacitor C10 of approximately 33 mfd. The other side of the capacitor C10 is grounded. The diode D1 allows the capacitor C10 to charge to a DC level through the resistor R12. The positive side of the capacitor C10 connects with the base of gating transistor Q6, the emitter of which is grounded. The collector of Q6 connects with one side of a resistor R13 of approximately 100 ohms. The other side of the resistor R13 connects with one side of a relay K1, the other side of which connects with J3 when SW1 is closed. A diode D2, which is the same as diode D1, connects across the coil of the relay K1. When K1 is energized, the movable contact will move to its upper position to place 12 volts from the auto battery on J4. Capacitor C15 connects from "A" to the positive side of D1 and acts as another high frequency filter.

When the charge on capacitor C10 reaches or exceeds 0.7 volts, which is the voltage required on the base of Q6 for its conduction, the transistor Q6 goes into conduction energizing K1 through the current limiting resistor R13 to place 12 volts DC on J4 as previously described and for a purpose which will hereinafter appear.

The transducers of each sensing group are preferably angled slightly towards each other; that is, the transmitting and receiving transducers 18 and 20 are slightly angled towards each other as diagramatically indicated in FIG. 5 to facilitate the reflection of a signal from the transmitting transducer 18 to an object and back to the receiving transducer 20. Any object within the "field" of the transmitting transducer 18 and receiving transducer 20 will reflect a certain amount of the transmitted signal back to the receiving transducer 20. However, if the object is stationary, then the reflected signal will be of the same frequency and will be in phase with the transmitted signal such that no signal appears across the variable resistor VR1. However, if the object within the field is moving, the signal received by the receiving transducer 20 will vary not only in amplitude, but in frequency and phase as well such that the tuned amplifier Q2 will provide a signal across VR1 which will be amplified by Q4 and Q5, ultimately charging capacitor C10 and firing the relay driver Q6. The same considerations hold true when the vehicle itself is moving towards or away from a fixed object within the "field" of the transducers 18 and 20. Thus, the operator 40 can position the front of the vehicle 10 at a desired fixed distance from a wall or the like using the system and circuit of the present invention. Furthermore, when the circuit of the present invention is used in conjunction with transducers 28 and 30, for example, which are mounted on the rear 15 of the vehicle 10, and assuming a circuit such as that disclosed in FIGS. 4 and 5 to be connected with transducers 28 and 30, the operator of the vehicle can back up the same to a fixed position from a wall or loading ramp, for example. If an object, such as a telephone pole or a wall is within the "field" of the transducers 18 and 20 and, assuming that the vehicle is completely motionless, no signal will be produced across the variable resistor VR1. However, from a practical standpoint, it is virtually impossible for a human being or an animal to remain completely motionless within the "field" of the transducers 18 and 20. The slight motion produced by any human being or animal within the "field" of the transducers 18 and 20 is sufficient for the tuned amplifier Q2 to detect a frequency change which presents itself across VR1 as a signal which is then amplified by Q4 and Q5 and which is sufficient to fire the relay driver Q6.

Any alarm device, such as a buzzer, horn or light can be connected to J4 such that when J4 is placed at a plus 12-volt potential by the actuation of the relay K1, such alarm device will be activated. For the purposes of illustration, a light bulb 46, which is located on the dash 48, will be connected between J4 and ground so that when the relay K1 is energized, the light 46 will present a visual signal to the operator 40.

Turning now to a further consideration of FIG. 5, in light of the above description, the transmitting transducer 18, the transmitter amplifier Q3, the receiver transducer 20, the receiver amplifier Q1 and the tuned amplifier Q2 together constitute a feedback oscillator circuit; when the character of the feedback on VR2 changes as a result of movement of an object in the field of the transducers 18 and 20, the tuned amplifier will produce an output signal across VR1.

It has been discovered that the amount of signal produced across VR1 will depend upon the proximity to the transducers 18 and 20 of the movable object within the "field" of these transducers. Thus, the sensitivity of the sensing system can be increased or decreased by moving the variable contact on VR1. By varying the position of the movable contact from its lowermost position to its uppermost position, as shown in FIGS. 4 and 5, it is possible to change the sensitivity of the system from a distance of about 1 foot to a distance of about 15 feet in relation to an object entering or moving within the "field" of the transducers. In order to permit the operator 40 to make this sensitivity adjustment, a knob 42 may be conveniently located on the panel 48 as shown in FIG. 3. The shaft (not shown), which is turned by this knob 42, can be connected to the shaft which varies the variable contact on VR1. The dial, surrounding the knob 42, can be calibrated, if desired, to represent the different feet of sensitivity represented by the desired position of the object entering into or moving within the "field" for the purpose of firing Q6. Such a control, such as the knob 42, might be of considerable assistance to the operator 40 in connection with the operation of a rear sensing group, as previously explained, when backing the vehicle towards a wall or loading dock.

When the transducers 18 and 20 are mounted on the vehicle 10, the distance between them is usually set at about 5 feet; however, they could be mounted together as close as 1 foot or as far apart as 8 feet, although in the latter two cases, the relative angling, which is shown in FIG. 5, will have to be adjusted as will also, possibly, the sensitivity control and some of the other variable controls in the circuit which have been described above.

Whereas, the present invention has been described in particular relation to the drawings attached hereto, it should be understood that other and further modifications, apart from those shown or suggested herein, may be made within the spirit and scope of this invention.

What is claimed is:

1. Apparatus for detecting the presence of an object moving relative to a vehicle within a location adjacent to said vehicle and hidden from the view of the operator of the vehicle comprising: a first transducer mounted on said vehicle for transmitting continuous ultrasonic signals of a given ultrasonic frequency into said hidden location, a second transducer mounted on said vehicle in spaced relation to said first transducer for receiving ultrasonic signals reflected from an object present in said hidden location, a first high frequency audio amplifier powering said first transducer to cause said first transducer to transmit said ultrasonic signals, a second high frequency audio amplifier for amplifying the ultrasonic signals received by said second transducer, a tuned amplifier coupled to said first high frequency audio amplifier and adapted to receive a portion of the signal amplified by said second high frequency audio amplifier, said tuned amplifier having an output only when there is relative motion between said object and said vehicle, said output of said tuned amplifier being a relatively low audio frequency signal representing a differential frequency between the transmitted signals and the received signals resulting from the change in the transmitted signals as produced by the relative motion between said object and said vehicle, a low frequency audio amplifier for amplifying a portion of the output of said tuned amplifier, and means responsive to the amplified signal from said low frequency audio amplifier for actuating an alarm when said portion of the output from said tuned amplifier exceeds a predetermined value.

2. Apparatus as set forth in claim 1 wherein said first transducer transmits ultrasonic signals in the frequency range of 30 to 40 Khz.

3. Apparatus as set forth in claim 1 wherein the portion of the output of said tuned amplifier which is fed to said low frequency audio amplifier can be varied to vary the sensitivity of the apparatus.

4. Apparatus as set forth in claim 1 wherein said means for actuating an alarm comprises means for rectifying the amplified signal from said low frequency audio amplifier to produce a DC voltage which energizes a relay operating said alarm.

5. Apparatus as set forth in claim 1 wherein said second transducer is mounted on said vehicle about 5 feet horizontally away from said first transducer.

6. Apparatus as set forth in claim 5 wherein said transducers are angled relatively towards each other.

* * * * *